3,379,508
ACTIVE SODA ASH COMPACTION
James A. Robertson, Levittown, Pa., assignor to
FMC Corporation, New York, N.Y., a corporation of Delaware
Filed May 28, 1965, Ser. No. 459,853
6 Claims. (Cl. 23—293)

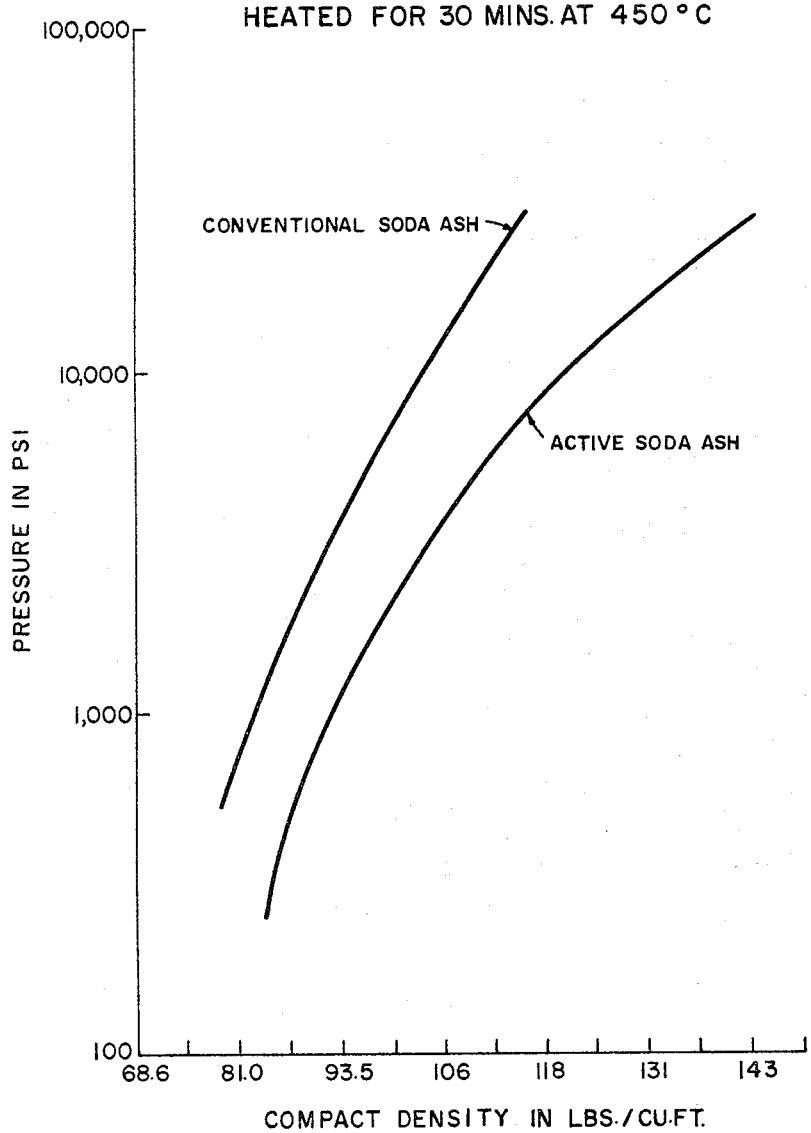

ABSTRACT OF THE DISCLOSURE

Highly dense, compact shapes of soda ash are formed from an "active soda ash," which have smaller crystallites and predominantly smaller pores than conventional soda ash, by pulverizing said "active soda ash" to about —200 mesh, compressing the pulverized "active soda ash" at substantially ambient temperatures under a pressure of at least about 200 p.s.i. into predetermined shapes and heating the compacted shapes to temperatures of at least about 350° C. until it converts to a more imporous coherent mass without melting.

---

This invention relates to "active soda ash" compacts and to a simplified technique for compacting said "active soda ash."

Soda ash (anhydrous sodium carbonate) is desired in industry in a highly dense compact state to reduce transportation costs and to simplify handling and use. Transportation of soda ash is relatviely expensive because conventional granular soda ash occupies no more than about 60 lbs./cu. ft. of cargo space. Since transportation costs are based on volume as well as weight of the item transported, a more dense ash is desirable to reduce these costs. Additionally, a compacted, dense form of soda ash is desired for use in a variety of furnace operations, for example desulfurizing iron in foundry furnaces. In such furnace applications wherein a gas stream is passed through a furnace, only dense masses can be added directly to the furnace without being blown out in the gas stream.

Densification of soda ash can be achieved by densifying the individual granules of soda ash, thereby increasing the bulk density, and by compressing the granules of soda ash into solid blocks or compacts. The present application is concerned only with this latter densification technique so as to increase the overall bulk density of granular soda ash from less than 60 lbs./cu. ft. to compacts having densities of up to about 150 lbs./cu. ft.

In an effort to produce soda ash compacts, prior workers have attempted to merely press conventional soda ash at room temperature under high pressures, i.e. on the order of about 50,000 p.s.i. However, this technique yields compacts which are readily subject to breakage on handling and shipping and whose density is not in excess of about 115 lbs./cut. ft.

Other compacting techniques which have been attempted include pressing soda ash with binding agents such as polyethylene glycol or simply fusing and casting soda ash into solid shapes. Compaction techniques using binders are most objectionable because the soda ash becomes contaminated with the binder and is unsatisfactory for use in processes requiring pure soda ash, e.g. glass manufacturing. The fusion of soda ash into desired shapes obviates most of the difficulties encountered with other techniques but the large heat requirements are prohibitive for large scale production of soda ash compacts.

An improvement in compacting techniques is set forth in a copending application Ser. No. 459,373, filed May 27, 1965 in the names of Robert D. Hulse and William F. Beck, now U.S. Patent 3,324,221. in which soda ash is compressed into a highly dense compact shape by simultaneously heating the soda ash at temperatures above 450° C. and compressing it into a desired shape. While this technique yields the desired soda ash compacts, the process requires compaction equipment in which the dies can be maintained at the compaction temperature while compression of soda ash occurs. The present invention is an improvement on this above process in which highly dense compacts can be obtained without employing a hot compaction technique.

It is an object of the present invention to produce soda ash compacts on a commercial scale, which are free of contaminants, which are resistant to normal breakage and which can be produced without compression of hot soda ash.

It is a further object to produce soda ash compacts at relatively low compacting pressures.

These and other objects will be apparent from the following description.

We have found that "active soda ash," which has small crystallities and predominantly small pores compared with conventional soda ash can be compressed into highly dense, compact form by pulverizing the active soda ash to about —200 mesh, compressing the active soda ash at substantially ambient temperature under pressures of at least about 200 p.s.i. into predetermined shapes, heating the compacted shapes to temperatures of at least about 350° C. until the compact has been converted to a more imporous coherent mass without melting and recovering a highly dense soda ash compact having good resistance to breakage.

In carrying out the present invention, pulverized active soda ash having a mesh size of —200 mesh is used as the feed. The active soda ash is produced by the process described in copending application Ser. No. 420,601, filed Dec. 23, 1964 in the names of Alan B. Gancy and Patrick M. Di Bello, now U.S. Patent 3,333,918. In this process a precursor crystal, e.g. sodium sesquicarbonate, is calcined under critical conditions of temperature and water vapor pressure to produce an "active soda ash" product. For example, sodium sesquicarbonate and sodium carbonate monohydrate can be converted to a highly "active soda ash" when heated at temperatures up to about 135° C. in an atmosphere having reduced water vapor pressures, e.g. below 350 mm. of mercury.

The compacts are produced by compressing a suitable charge of the above defined active soda ash in a press or mold at pressures of at least about 200 p.s.i. The compression can be carried out at any pressure above 200 p.s.i. up to about 100,000 p.s.i. However, pressures on the order of about 5,000 p.s.i. to about 50,000 p.s.i. are preferred. This compression can be carried out at substantially room temperature without heating either the soda ash charge or the mold or dies of the compacting press. Thereafter, the compact is heated to a temperature of at least about 350° C. but below the fusion temperature of the soda ash until the compacts have been converted into a more imporous coherent mass without melting. Normally heating at a temperature of about 450° C. for 30 minutes is sufficient to densify the product. Temperatures as high as 750° C. can be used to obtain more rapid densification.

Surprisingly, this technique of compressing active soda ash at ambient temperature followed by a subsequent heating step, does not produce acceptable compacts having either high strength or high density when carried out with conventional soda ash. Conventional soda ash is produced by the classic Solvay process, the sodium carbonate monohydrate processes as described in U.S. Patent 2,962,348, or from sodium sesquicarbonate by the crystallization process described in U.S. Patent 2,346,140.

The present process permits obtaining highly dense compacts which are unattainable by mere compression without heating. This is attributed to the unique structure of active soda-ash vis-a-vis other soda ash.

The invention can best be illustrated by reference to the attached drawing.

In the drawing there is illustrated in graphic form changes in density of the active soda ash compacts with changes in compacting pressure. The drawing further illustrates the lower densities that are obtained with conventional soda ash compared with active soda ash, when treated by the instant process.

The following examples are given to illustrate the present invention and are not deemed to be limiting thereof.

Example 1

Run A.—A series of runs were carried out for making soda ash compacts by compressing active soda ash charges of from about 0.3 g. to about 5.8 g. in a standard hydraulic Carver press made by the Fred S. Carver Company. Two dies were used depending upon the pressure to be exerted and the size of the charge; one had a cross-sectional surface area of 0.151 square inch and the other an area of 0.995 square inch. Higher pressures than those capable of being exerted in the Carver press were obtained by compressing the sample in an Isostatic press made by the Loomis Engineering Company.

The active soda ash samples were prepared by heating sodium sesquicarbonate produced by the method set forth in U.S. Patent 2,954,282 at a mean temperature of 81,7° C. in a 1¾ inch diameter fluid bed in an atmosphere containing water vapor pressures below 350 mm. of mercury. The calcination was carried out for about 30 minutes until all of the sodium sesquicarbonate was converted to active soda ash.

The compacts were formed by grinding the soda ash samples to −200 mesh and pressing charges of the active soda ash in either the Carver press or the Isostatic press at ambient temperature at the pressures specified in Table I. Thereafter, compacts were heated in a muffle furnace at 450° C. for 30 minutes. The density of the resulting compacts was measured by mercury displacement in an Aminco-Winslow Porosimeter. The pressure applied and resulting density of the soda ash compacts are given in Table I.

Run B.—The same procedure was employed as in Run A except that the soda ash sample was conventional soda ash obtained by the process of U.S. Patent 2,954,282. The density of the resulting compacts was measured by mercury displacement in an Aminco-Winslow Porosimeter. The pressure applied and resulting density of the soda ash compact are given in Table II.

TABLE I

| Starting Material | Pressures (p.s.i.) | Temperature (° C.) | Density (lbs./cu. ft.) |
| --- | --- | --- | --- |
| Active Soda Ash | 201 | 25 | 83.6 |
| | 1,005 | 25 | 86.7 |
| | 2,009 | 25 | 99.3 |
| | 5,023 | 25 | 108 |
| | 20,000 | 25 | 138 |
| | 25,000 | 25 | 139 |
| | 30,000 | 25 | 143 |
| | 1,654 | 25 | 91.0 |
| | 3,308 | 25 | 102 |
| | 4,962 | 25 | 106 |
| | 6,616 | 25 | 110 |
| | 13,231 | 25 | 123 |
| | 33,087 | 25 | 138 |
| | 39,000 | 25 | 144 |
| | 52,924 | 25 | 148 |

TABLE II

| Starting Material | Pressures (p.s.i.) | Temperature (° C.) | Density (lbs./cu. ft.) |
| --- | --- | --- | --- |
| Conventional Soda Ash | 502 | 25 | 79.1 |
| | 804 | 25 | 81.0 |
| | 1,005 | 25 | 84.1 |
| | 2,009 | 25 | 91.6 |
| | 5,023 | 25 | 93.5 |
| | 10,047 | 25 | 103 |
| | 15,070 | 25 | 108 |
| | 20,000 | 25 | 109 |
| | 25,000 | 25 | 112 |
| | 30,000 | 25 | 115 |

The results obtained in Tables I and II are shown in graphic form in the drawing. The horizontal axis of the drawing defines the density of the soda ash compact while the vertical axis defines the pressure used in forming the compact. As will be observed from the drawing, the active soda ash is capable of forming substantially higher density compacts compared with conventional soda ash by the instant process. This is particularly true at pressures above about 10,000 p.s.i. wherein the conventional soda ash can only be densified up to densities of about 112 lbs./cu. ft. whereas, the present process is capable of densifying active soda ash into compacts having densities on the order of about 143 lbs./cu. ft.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. Process of forming active soda ash into a highly dense compact, said soda ash having smaller crystallites and predominantly smaller pores than conventional soda ash and being formed by calcining precursor crystals capable of being calcined to soda ash in an atmosphere having an ambient water vapor pressure below about 350 mm. of mercury until said crystals have been converted to active soda ash, which comprises compression by pressure-shaping means said active soda ash at substantially ambient temperature under a pressure of at least about 200 p.s.i. into a predetermined shape, thereafter heating the compacted shape to temperatures of at least about 350° C. until it has been converted into a more imporous coherent mass without melting, and recovering a highly dense soda ash compact.

2. Process of claim 1 in which the compression is carried out at from about 300 p.s.i. to about 50,000 p.s.i.

3. Process of claim 1 in which the compression is carried out at from about 5,000 to about 50,000 p.s.i.

4. Process of claim 1 in which the heating is carried out at temperatures of from about 350° C. to about 750° C.

5. Process of forming active soda ash into a highly dense compact, said soda ash having smaller crystallites than conventional soda ash and being formed by calcining precursor crystals selected from the group consisting of sodium carbonate monohydrate and sodium sesquicarbonate, wherein said precursor crystals are calcined to soda ash in an atmosphere having an ambient water vapor pressure of below about 350 mm. of mercury at temperatures of about 85° to about 135° C. until said crystals have been converted to active soda ash, which comprises compressing by pressure-shaping means said active soda ash at substantially ambient temperature under a pressure of from about 5,000 p.s.i. to about 50,000 p.s.i. into a predetermined shape, thereafter heating the compacted shape to temperatures of from about 350° to about 750° C. until it has been converted into a more imporous coherent mass without melting, and recovering a highly dense soda ash compact.

6. Process of claim 5 wherein said active soda ash has a particle size of −200 mesh prior to being compressed.

References Cited

UNITED STATES PATENTS

| | | | |
|---|---|---|---|
| 1,907,987 | 5/1933 | Lynn | 23—63 |
| 3,245,755 | 4/1966 | Comer | 23—63 |
| 1,906,574 | 5/1933 | Gleichert | 23—63 |
| 3,104,942 | 9/1963 | Handwerk et al. | 23—63 |
| 3,309,111 | 3/1967 | Gancy | 23—63 |
| 3,324,221 | 6/1967 | Hules | 23—63 |
| 3,333,918 | 8/1967 | Gancy | 23—63 |

NORMAN YUDKOFF, *Primary Examiner.*

G. P. HINES, *Assistant Examiner.*